Nov. 3, 1959 J. E. OSBORN 2,911,251
PIPE TONGS
Filed Oct. 29, 1956

INVENTOR
JOHN EUGENE OSBORN
BY
ATTORNEY

2,911,251
PIPE TONGS
John E. Osborn, Drexel, Mo.
Application October 29, 1956, Serial No. 618,963
10 Claims. (Cl. 294—110)

The present invention relates to improvements in pipe tongs and more particularly to a novel and improved structure for pipe tongs of the type provided with means for automatically releasing the pipe after transferring the same to a desired position.

I am aware that various constructions have been proposed heretofore for pipe tongs. However, such prior art pipe tongs have not proved satisfactory for a number of reasons and particularly when used under adverse conditions in the field. For example, in the construction of underground pipe lines, it is often necessary to transfer sections of pipe over rough terrain or in confined quarters. In such instances, it is difficult for a helper to quickly, easily and safely remove the tongs from the section of pipe after the same is transferred to a desired location. This is both time-consuming and dangerous since the pipe may often roll or otherwise shift its position after being released with the possibility of pinning the helper. Still other disadvantages are inherent in prior art pipe tong constructions such as an undue multiplicity and number of complicated parts which are expensive to manufacture and thereby result in an unnecessarily high original cost, as well as unnecessarily high upkeep. Even more important, the pipe tongs of the prior art have been constructed in such a manner as to cause dents, scars, and other damage to the pipe.

The present invention is primarily concerned with a novel and improved construction for pipe tongs which will overcome the above-mentioned disadvantages of prior art pipe tongs and, in addition, offer many advantages not heretofore contemplated in related devices. The pipe tongs of the present invention are so constructed and designed as to release a section of pipe automatically upon lowering the same into position and may be lifted clear of the pipe without the necessity of a helper being present. Thus, the pipe tongs of the invention are not only faster, but are also much safer in dangerous construction work, such as in the laying of an underground pipe line. The pipe tongs of the present invention also offer other advantages, such as being so designed as to prevent the denting, scarring or other damage to the pipe surface. In addition, the pipe tongs of the invention are of a greatly simplified design and construction which may be manufactured at low cost, yet are durable and useful over a long life.

It is an object of the present invention to provide a novel and improved construction for pipe tongs of the type provided with means for automatically releasing the pipe after transferring the same to a desired location.

It is still a further object of the present invention to provide a novel and improved construction for pipe tongs of the automatic release-type, the pipe tongs being so constructed as to prevent denting, scarring or other damage to a section of pipe during use of the tongs for transfer of the same.

It is still a further object of the present invention to provide a novel and improved construction for pipe tongs of the automatic release-type, the pipe tongs being so constructed as to require a minimum number of simple parts that may be cheaply and easily manufactured and assembled into a durable device having a long and useful life.

Still other objects of the present invention and advantages thereof will be apparent to those skilled in the art by reference to the following detailed description and the drawing, in which.

Figure 1:
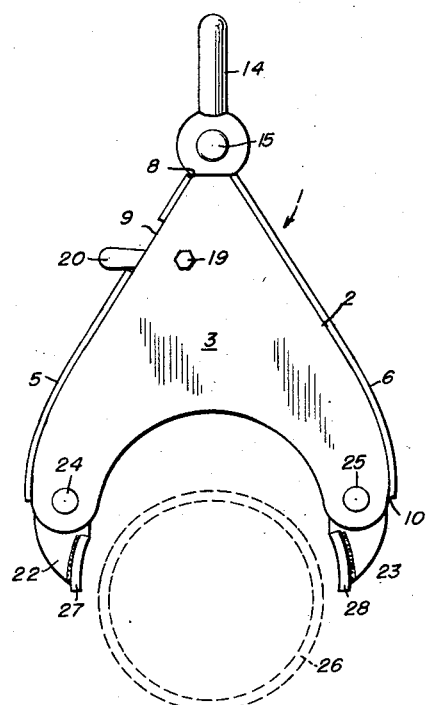
Figure 1 is a front view of pipe tongs constructed in accordance with a presently preferred embodiment of the present invention.
Figure 2:
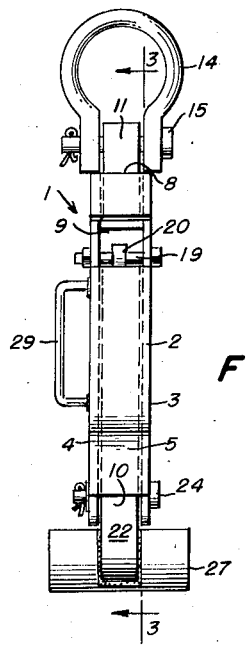
Figure 2 is a side view of the pipe tongs of Figure 1.

Referring now to the drawing and more particularly to Figures 1 and 2, the pipe tongs 1 comprise a casing 2 which is preferably constructed from a pair of spaced flat front and back plates 3 and 4 and a pair of oppositely disposed side plates 5 and 6. The front and back plates 3 and 4 and the side plates 5 and 6 are preferably welded together or otherwise suitably joined to form casing 2 as a sturdy one-piece member. A handle 29 is attached to back plate 4 to provide a convenient means for guiding or moving pipe tongs 1 to a desired location. The pipe tongs 1 normally are attached by means of shackle 14 to a line or cable (not shown) which may lead from a boom or the like.

Figure 4:
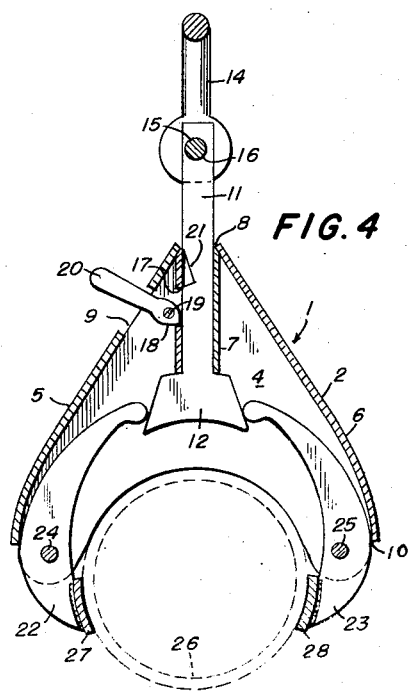
Figure 4 is a sectional view similar to Figure 3, but showing various component parts of the pipe tongs in a closed position.
Figure 3:
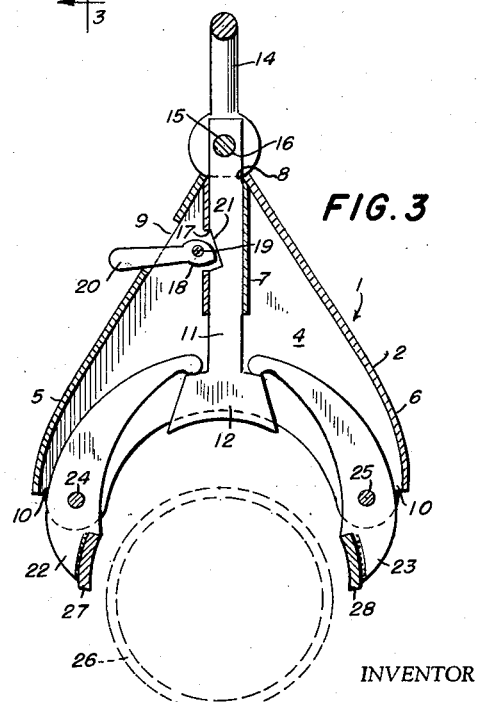
Figure 3 is a sectional view taken along the line 3—3 of Figure 2 and showing various component parts of the pipe tongs in an open position.

Referring now to Figures 3 and 4, the casing 2 is provided with an internal guide member 7 which is preferably formed from relatively heavy sheet metal and welded to casing 2. The casing 2 is also provided with an upper opening 8, a side opening 9 in side plate 5 and a lower opening 10. It will be noted that guide member 7 is arranged in a generally upright manner with the upper end thereof directly below opening 8 in casing 2.

A shank 11 carrying a downwardly flared body 12 on its lower end is slidably mounted in guide member 7 and extends upward and through opening 8 in casing 2 a distance sufficient to attach shackle 14 to the upper end thereof. The downwardly flared body 12 preferably has a generally wedge-shaped configuration, as shown. The shackle 14 is attached to shank 11 by means of pin 15 inserted through opening 16. It will be noted that shank 11 is slidably mounted in guide member 7 so as to be free to move reciprocally in guide member 7 a predetermined distance when it is so desired. For example, the shank 11 may be moved upward in guide member 7 until downwardly flared body 12 strikes the lower end thereof, the lower end of guide member 7 thereby serving as a stop on upward movement of shank 11. Similarly, the shank 11 may be moved downward in guide member 7 until shackle 14 strikes casing 2, casing 2 thereby serving as a stop on downward movement of shank 11.

The guide member 7 is provided with an opening 17. A latch 18 is pivotally mounted to casing or body member 2 by means of pin 19 and provided with a latch operating arm 20 which extends through opening 9 in side plate 5 a distance sufficient for convenient operation. The shank 11 is provided with a notch 21 which is so arranged as to be in communication with opening 17 in guide member 7 when shank 11 has moved downward a distance sufficient for shackle 14 to strike casing 2. When the shank 11 is positioned as shown in Fig. 3, the latch 18 is so designed as to fall automatically into notch 21 and thus prevent appreciable upward movement of shank 11 until latch operating arm 20 is pushed upward thereby removing latch 18 from opening 17, as shown in Fig. 4. The latch operating arm 20 preferably is of a sufficient length and weight as to fall downward by gravity movement and rotate latch 18 from the position shown in Fig. 4 to the position shown in Fig. 3 when notch 21 is opposite opening 17 in guide member 7.

A pair of curved jaws 22 and 23 are mounted in casing 2 by means of pins 24 and 25 in a generally upright position and in spaced relationship with the concave or inner curved surfaces thereof facing toward the center of casing 2. Preferably, when downwardly flared body 12 is in the position shown in Figure 3, the jaws 22 and 23 are so mounted that their centers of gravity are inwardly disposed relative to their pivot points and the upper end portions are movable together by force of gravity a distance sufficient to allow the lower end portions to spread to an opened position. The pair of jaws 22 and 23 extend through opening 10 in casing 2 a distance sufficient to allow proper operation of pipe tongs 1 and are provided with pads 27 and 28 for the purpose of contacting pipe 26 in such a manner as to prevent damage to the pipe. The pads 27 and 28 provide an enlarged surface area in contact with pipe 26 and also may be constructed with a soft flexible material covering their concave surfaces where it is desirable. It will be noted that when the pipe tongs 1 are in an open position, as shown in Fig. 3, the lower portions of the pair of jaws 22 and 23 are spread a distance sufficient to easily pass over pipe 26; and when in the closed position, as shown in Fig. 4, the lower portions of the pair of jaws 22 and 23 are closed inwardly a sufficient amount to partially encircle and prevent the pipe 26 from escaping but not to such an extent as to apply undue inward pressure on the same.

When using the pipe tongs 1 of the present invention, the pipe tongs 1 are normally suspended in the upright position shown in the drawing. This may be most conveniently accomplished by attaching a line leading from a boom to shackle 14. The pipe tongs 1 suspended in the open position shown in Fig. 3 are lowered over a section of pipe 26 in such a manner that pads 27 and 28 on the pair of jaws 22 and 23 are positioned on pipe 26 and ready to engage the same when moved to the closed position, thereby preventing escape of the pipe 26 and without applying undue inward pressure. The latch operating arm 20 is then moved upward to the position shown in Fig. 4 for the purpose of disengaging latch 18 from notch 21 in shank 11. Shank 11 is now free to move upward as force in lifting the pipe is applied upward on shank 11 until downwardly flared body 12 is carried upward a distance sufficient to strike the lower end of guide member 7, as shown in Fig. 4. As the downwardly flared body 12 is carried upward by shank 11, the wedge-shaped surfaces thereof engage the upper ends of the pair of jaws 22 and 23, thereby spreading the same and causing the lower ends of jaws 22 and 23 to close to the position shown in Fig. 4. When the jaws 22 and 23 are in the closed position of Fig. 4, the pipe 26 is loosely engaged and held by the pads 27 and 28 on jaws 22 and 23 without appreciable inward pressure. Also, the surface area of pads 27 and 28 and the nature of the materials used in their construction is such as to prevent damage to pipe 26. The pipe 26 may now be lifted and transferred to a desired position. After the transfer operation is completed the shank 11 is free to fall downward of its own weight until shackle 14 strikes casing 2, as shown in Fig. 3. When shank 11 is in this position notch 21 is in communication with opening 17 and latch operating arm 20 falls downward of its own weight thereby moving latch 18 into notch 21. Also, as the shank 11 moved downward, the downwardly flared wedge body 12 was carried downward, allowing the jaws 22 and 23 to spread to the open position. Since latch 18 now engages notch 21 of shank 11, the shank 11 is not free to move upward at this time and thus the tongs 1 may be lifted free of the pipe 26 immediately and without manual adjustment. The tongs 1 are now in an open position and ready for lifting and transferring a second length of pipe.

It will be apparent from the drawing and foregoing detailed description that a novel construction and design for pipe tongs has been illustrated and described which will overcome the many disadvantages inherent in related prior art devices. It will be further apparent to those skilled in the art that the pipe tongs of the invention are of a greatly simplified design, yet durable and useful over a long life. Also, the pipe tongs of the invention are easier to use, faster in operation, and much safer than pipe tongs in use heretofore.

The foregoing detailed description and the drawing which illustrates a presently preferred embodiment of the present invention are for the purpose of illustration only, and are not to be taken as limiting to the spirit or scope of the appended claims.

What is claimed is:

1. Tongs comprising a casing, a pair of curved jaws pivotally mounted within the casing in spaced relationship, the pair of curved jaws being pivotally mounted at points remote from their respective ends, below their respective centers of gravity and having upper end portions above their respective points of pivot and lower end portions below their respective points of pivot, a downwardly flared body mounted within the casing and movable between predetermined first and second positions, the downwardly flared body being arranged between the pair of jaws and engageable with the upper end portions of the jaws, the upper end portions of the pair of jaws being movable together by gravity a distance sufficient to allow the lower end portions of the pair of jaws to spread to an opened position when the downwardly flared body is in the first position, the upper end portions of the pair of jaws being spread by the downwardly flared body a distance sufficient to cause the lower end portions of the pair of jaws to move to a closed position when the downwardly flared body is in the second position, means carried by the casing actuated by force applied to the tongs when being lifted for moving the downwardly flared body from the first position to the second position, said means including means supplemented by gravity for returning the downwardly flared body from the second position to the first position when the lifting force is no longer applied to the tongs, means carried by the casing for preventing movement of the downwardly flared body past the second position, means carried by the casing for arresting movement of the downwardly flared body upon movement from the first position to the second position, and means carried by the casing for releasing the arresting means to thereby allow movement of the downwardly flared body to the second position.

2. Tongs comprising a casing, a pair of jaws pivotally mounted within the casing in spaced relationship, the pair of jaws being pivotally mounted at points remote from their respective ends and having upper end portions above their respective points of pivot and lower end portions below their respective points of pivot, a shank carrying a downwardly flared body mounted within the casing, the shank and downwardly flared body being movable between predetermined first and second positions, the downwardly flared body being arranged between the pair of jaws and engageable with the upper end portions of the jaws, the upper end portions of the pair of jaws being movable together a distance sufficient to allow the lower end portions of the pair of jaws to spread to an opened position when the shank and the downwardly flared body are in the first position, the upper end portions of the pair of jaws being spread by the downwardly flared body a distance sufficient to cause the lower end portions of the pair of jaws to move to a closed position when the shank and the downwardly flared body are in the second position, the shank and the downwardly flared body being movable from the first position to the second position by force applied to the shank when lifting the tongs, means supplemented by gravity for returning the shank and the downwardly flared body from the second position to the first position when the lifting force is no longer applied to the shank, means carried by the casing for preventing movement of the shank and downwardly flared body past the second position, means carried by the casing for releasably engaging the shank when the shank is in the first position and for arresting movement of the shank and the downwardly flared body upon movement from the first position to the second position, and means carried by the casing for releasing the shank engaging means to thereby allow movement of the shank and the downwardly flared body to the second position.

3. Tongs comprising a casing, a pair of curved jaws pivotally mounted within the casing in spaced relationship, the pair of jaws being pivotally mounted at points remote from their respective ends, below their respective centers of gravity, and having upper end portions above their respective points of pivot and lower end portions below their respective points of pivot, a shank carrying a downwardly flared body mounted within the casing, the shank and downwardly flared body being movable between predetermined first and second positions, the downwardly flared body being arranged between the pair of jaws and engageable with the upper end portions of the jaws, the upper end portions of the pair of jaws being movable together a distance sufficient to allow the lower end portions of the pair of jaws to spread to an opened position when the shank and the downwardly flared body are in the first position, the upper end portions of the pair of jaws being spread by the downwardly flared body a distance sufficient to cause the lower end portions of the pair of jaws to move to a closed position when the shank and the downwardly flared body are in the second position, the shank and the downwardly flared body being movable from the first position to the second position by force applied to the shank when lifting the tongs, means supplemented by gravity for returning the shank and the downwardly flared body from the second position to the first position when the lifting force is no longer applied to the shank, means carried by the casing for preventing movement of the shank and downwardly flared body past the second position, means carried by the casing for releasably engaging the shank when the shank is in the first position and for arresting movement of the shank and the downwardly flared body upon movement from the first position to the second position, and means carried by the casing for releasing the shank engaging means to thereby allow movement of the shank and the downwardly flared body to the second position.

4. Tongs comprising a casing, a pair of jaws pivotally mounted in the casing in spaced relationship, the pair of jaws being pivotally mounted at points remote from their respective ends and having upper end portions above their respective points of pivot and lower end portions below their respective points of pivot, a shank carrying a downwardly flared body mounted within the casing, the shank and downwardly flared body being movable between predetermined first and second positions, the downwardly flared body being arranged between the pair of jaws and engageable with the upper end portions of the jaws, the upper end portions of the pair of jaws being movable together a distance sufficient to allow the lower end portions of the pair of jaws to spread to an opened position when the shank and the downwardly flared body are in the first position, the upper end portions of the pair of jaws being spread by the downwardly flared body a distance sufficient to cause the lower end portions of the pair of jaws to move to a closed position when the shank and the downwardly flared body are in the second position, the shank and the downwardly flared body being movable from the first position to the second position by force applied to the shank when lifting the tongs, means supplemented by gravity for returning the shank and the downwardly flared body from the second position to the first position when the lifting force is no longer applied to the shank, means carried by the casing for preventing movement of the shank and downwardly flared body past the second position, a latch carried by the casing, the latch releasably engaging the shank when the shank is in the first position and arresting movement of the shank and the downwardly flared body upon movement from the first position to the second position, and means carried by the casing for disengaging the latch from the shank to thereby allow movement of the shank and the downwardly flared body to the second position.

5. Tongs comprising a casing, a pair of curved jaws pivotally mounted in the casing in spaced relationship, the pair of jaws being pivotally mounted at points remote from their respective ends, below their respective centers of gravity, and having upper end portions above their respective points of pivot and lower end portions below their respective points of pivot, a shank carrying a downwardly flared body mounted within the casing, the shank and downwardly flared body being movable between predetermined first and second positions, the downwardly flared body being arranged between the pair of jaws and engageable with the upper end portions of the jaws, the upper end portions of the pair of jaws being movable together a distance sufficient to allow the lower end portions of the pair of jaws to spread to an opened position when the shank and the downwardly flared body are in the first position, the upper end portions of the pair of jaws being spread by the downwardly flared body a distance sufficient to cause the lower end portions of the pair of jaws to move to a closed position when the shank and the downwardly flared body are in the second position, the shank and the downwardly flared body being movable from the first position to the second position by force applied to the shank when lifting the tongs, means supplemented by gravity for returning the shank and the downwardly flared body from the second position to the first position when the lifting force is no longer applied to the shank, means carried by the casing for preventing movement of the shank and downwardly flared body past the second position, a latch carried by the casing, the latch releasably engaging the shank when the shank is in the first position and arresting movement of the shank and the downwardly flared body upon movement from the first position to the second position, and means carried by the casing for disengaging the latch from the shank to thereby allow movement of the shank and the downwardly flared body to the second position.

6. Tongs comprising a casing, a pair of jaws pivotally mounted in the casing in spaced relationship, the pair of jaws being pivotally mounted at points remote from their respective ends and having upper end portions above their respective points of pivot and lower end portions below their respective points of pivot, a shank carrying a downwardly flared body mounted within the casing, the shank and downwardly flared body being movable between predetermined first and second positions, the downwardly flared body being arranged between the pair of jaws and engageable with the upper end portions of the jaws, the upper end portions of the pair of jaws being movable together a distance sufficient to allow the lower end portions of the pair of jaws to spread to an opened position when the shank and the downwardly flared body are in the first position, the upper end portions of the pair of jaws being spread by the downwardly flared body a distance sufficient to cause the lower end portions of the pair of jaws to move to a closed position when the shank and the downwardly flared body are in the second position, the shank and the downwardly flared body being movable from the first position to the second position by force applied to the shank when lifting the tongs, the shank and the downwardly flared body being movable from the second position to the first position by force of gravity when the lifting force is no longer applied to the shank, means carried by the casing for preventing movement of the shank and downwardly flared body past the second position, a latch carried by the casing, the latch releasably engaging the shank when the shank is in the first position and arresting movement of the shank and the downwardly flared body upon movement from the first position to the second position, and means carried by the casing for disengaging the latch from the shank to thereby allow movement of the shank and the downwardly flared body to the second position.

7. Tongs comprising a casing, a pair of curved jaws pivotally mounted in the casing in spaced relationship, the pair of jaws being pivotally mounted at points remote from their respective ends, below their respective centers of gravity, and having upper end portions above their respective points of pivot and lower end portions below their respective points of pivot, a shank carrying a downwardly flared body mounted within the casing, the shank and downwardly flared body being movable between predetermined first and second positions, the downwardly flared body being arranged between the pair of jaws and engageable with the upper end portions of the jaws, the upper end portions of the pair of jaws being movable together a distance sufficient to allow the lower end portions of the pair of jaws to spread to an opened position when the shank and the downwardly flared body are in the first position, the upper end portions of the pair of jaws being spread by the downwardly flared body a distance sufficient to cause the lower end portions of the pair of jaws to move to a closed position when the shank and the downwardly flared body are in the second position, the shank and the downwardly flared body being movable from the first position to the second position by force applied to the shank when lifting the tongs, the shank and the downwardly flared body being movable from the second position to the first position by force of gravity when the lifting force is no longer applied to the shank, means carried by the casing for preventing movement of the shank and downwardly flared body past the second position, a latch carried by the casing, the latch releasably engaging the shank when the shank is in the first position and arresting movement of the shank and the downwardly flared body upon movement from the first position to the second position, and means carried by the casing for disengaging the latch from the shank to thereby allow movement of the shank and the downwardly flared body to the second position.

8. Tongs comprising a body member, a pair of jaws mounted on the body member in spaced relationship, at least one jaw of the pair of jaws being pivotally mounted at a point remote from the ends thereof and having an upper end portion above the point of pivot and a lower end portion below the point of pivot, a movable member carried by the body member, a camming surface carried by the movable member and engageable with the upper portion of the pivotable jaw, the movable member being movable between predetermined first and second positions, the upper end portion of the pivotally mounted jaw being movable a distance sufficient to allow the lower end portion of the jaw to move to an opened position when the movable member is in the first position, the camming surface being so shaped that on upward movement of the movable member the upper portion of the movable jaw is moved a distance sufficient to cause the lower end portion of the pivotally mounted jaw to move to a closed position when the movable member is in the second position, means actuated by force applied to the tongs when being lifted for moving the movable member from the first position to the second position, the movable member including means supplemented by gravity for returning the movable member from the second position to the first position when the lifting force is no longer applied to the tongs, means carried by the body member for preventing movement of the movable member past the second position, means carried by the body member for arresting movement of the movable member upon movement thereof from the first position to the second position, and means carried by the casing for releasing the arresting means to thereby allow movement of the movable member to the second position.

9. Tongs comprising a body member, a pair of jaws mounted on the body member in spaced relationship, at least one jaw of the pair of jaws being pivotally mounted at a point remote from the ends thereof and having an upper end portion above the point of pivot and a lower end portion below the point of pivot, a shank carried by the body member, a camming surface carried by the shank and engageable with the upper portion of the pivotable jaw, the shank being movable between predetermined first and second positions, the upper end portion of the pivotally mounted jaw being movable a distance sufficient to allow the lower end portion of the jaw to move to an opened position when the shank is in the first position, the camming surface being so shaped that on upward movement of the shank the upper portion of the movable jaw is moved a distance sufficient to cause the lower end portion of the pivotally mounted jaw to move to a closed position when the shank is in the second position, means actuated by force applied to the tongs when being lifted for moving the shank from the first position to the second position, the shank including means supplemented by gravity for returning the shank from the second position to the first position when the lifting force is no longer applied to the tongs, means carried by the body member for preventing movement of the shank past the second position, means carried by the body member for arresting movement of the shank upon movement thereof from the first position to the second position, and means carried by the casing for releasing the arresting means to thereby allow movement of the shank to the second position.

10. Tongs comprising a body member, a pair of curved jaws mounted on the body member in spaced relationship, at least one jaw of the pair of jaws being pivotally mounted at a point remote from the ends thereof below its center of gravity and having an upper end portion above the point of pivot and a lower end portion below the point of pivot, a shank carried by the body member, a camming surface carried by the shank and engageable with the upper portion of the pivotable jaw, the shank being movable between predetermined first and second positions, the upper end portion of the pivotally mounted jaw being movable a distance sufficient to allow the lower end portion of the jaw to move to an opened position when the shank is in the first position, the camming surface being so shaped that on upward movement of the shank the upper portion of the movable jaw is moved a distance sufficient to cause the lower end portion of the pivotally mounted jaw to move to a closed position when the shank is in the second position, means actuated by force applied to the tongs when being lifted for moving the shank from the first position to the second position, the shank including means supplemented by gravity for returning the shank from the second position to the first position when the lifting force is no longer applied to the tongs, means carried by the body member for preventing movement of the shank past the second position, means carried by the body member for arresting movement of the shank upon movement thereof from the first position to the second position, and means carried by the casing for releasing the arresting means to thereby allow movement of the shank to the second position.

(References on following page)

References Cited in the file of this patent

UNITED STATES PATENTS

| | | | |
|---|---|---|---|
| 172,954 | Beeman et al. | Feb. 1, | 1876 |
| 524,696 | Abbott et al. | Aug. 21, | 1894 |
| 768,253 | Watson | Aug. 23, | 1904 |
| 966,676 | Farrell | Aug. 9, | 1910 |
| 1,409,197 | Robison | Mar. 14, | 1922 |
| 1,422,185 | Dalitz | July 11, | 1922 |
| 1,467,604 | Bowen et al. | Sept. 11, | 1923 |
| 1,538,406 | McCarty et al. | May 19, | 1925 |
| 1,742,767 | Hughes | Jan. 7, | 1930 |
| 2,215,844 | Van Syckle | Sept. 24, | 1940 |
| 2,313,599 | Surges | Mar. 9, | 1943 |
| 2,350,692 | Milek | June 6, | 1944 |
| 2,366,982 | Pryor | Jan. 9, | 1945 |
| 2,383,078 | Pringle | Aug. 21, | 1945 |
| 2,397,554 | Lontz | Apr. 2, | 1946 |
| 2,507,549 | Smith et al. | May 16, | 1950 |
| 2,520,815 | Shaboo | Aug. 29, | 1950 |
| 2,617,678 | Kelso | Nov. 11, | 1952 |
| 2,768,019 | Brooks | Oct. 23, | 1956 |

UNITED STATES PATENT OFFICE

CERTIFICATE OF CORRECTION

Patent No. 2,911,251            November 3, 1959

John E. Osborn

It is hereby certified that error appears in the printed specification of the above numbered patent requiring correction and that the said Letters Patent should read as corrected below.

Column 4, line 20, column 5, line 17, column 6, line 17, and column 7, line 17, after "ends", each occurrence, strike out the comma; column 5, line 18, column 6, line 18, and column 7, line 18, after "gravity", each occurrence, strike out the comma; column 8, lines 7, 38, and 71, for "casing", each occurrence, read -- body member --.

Signed and sealed this 25th day of October 1960.

(SEAL)
Attest:

KARL H. AXLINE            ROBERT C. WATSON
Attesting Officer            Commissioner of Patents